Nov. 4, 1969         D. O. NOORLANDER         3,476,085
                AIR-VENT FOR MILKING INFLATION
                   Filed Dec. 27, 1967

INVENTOR.
                            DANIEL O. NOORLANDER
                            BY
                                    ATTORNEYS

United States Patent Office 3,476,085
Patented Nov. 4, 1969

3,476,085
AIR-VENT FOR MILKING INFLATION
Daniel O. Noorlander, 5767 N. Bond St.,
Fresno, Calif. 93726
Filed Dec. 27, 1967, Ser. No. 693,921
Int. Cl. A01j 5/04
U.S. Cl. 119—14.36                                4 Claims

ABSTRACT OF THE DISCLOSURE

An air-vent comprising a rigid plug having a tapered barrel portion and a transverse flange. The barrel portion is engaged in a hole in the wall of the milk tube portion of an inflation just below the teat receiving cup portion thereof and the flange engages against the outside of the wall. The plug has a port therethrough comprising a number 60–80 standard drill size hole for admitting a metered amount of air into the upper end of the milk tube portion of a milking inflation adjacent the cup portion thereof for pushing milk out of the milk tube portion and preventing excessive pressure from being exerted on the teat orifice.

BACKGROUND OF THE INVENTION

Field of the invention

This invention relates generally to teat cup assemblies for milking machines and more particularly to an air-vent plug adapted to be inserted in the wall of a milking inflation for improving the milk flow therethrough.

Description of the prior art

In conventional automatic milkers, the teat cup assemblies each comprise a resilient milking inflation, usually made of natural or synthetic rubber, suspended longitudinally within a rigid shell of substantially greater diameter, forming a hermetically sealed air-vacuum chamber between the inflation and the shell. The chamber so formed has a port through which the chamber is intermittently evacuated and returned to substantially atmospheric pressure by the pulsator of the milking machine. When the cow's teat is inserted into the mouth of the milking inflation, the vacuum applied inside of the inflation through the vacuum milk line holds the teat cup assembly in air-tight relation on the teat and reduces the pressure at the teat opening for milking. The pressure differential between the pressure in the teat and the reduced pressure outside the teat end causes the teat opening to dilate against the closing force of the sphincter muscle which encircles the teat opening thereby allowing milk to flow from the teat.

The vacuum required to open the teat in the manner described is too great for continuous application and the teat must therefore be relieved of the vacuum periodically during the milking operation to avoid congestion and hemorrhaging in the teat. Proper relief is obtained by causing the inflation to collapse below the teat end, thus, isolating the teat from the vacuum applied through the milk line. Collapsing of the inflation occurs when the air-vacuum chamber is opened to atmospheric pressure by the pulsator. When the air-vacuum chamber is then evacuated and the reduced pressure therein approaches that within the inflation, the inflation opens and milk flow from the teat resumes. The inflation must close completely during the resting phase of each milking cycle to provide adequate relief for the teat in order to avoid injury to the teat and disease, particularly mastitis.

During the resting phase, when the milking inflation is collapsed, the milk flow from the teat is briefly interrupted causing a change of pressure in the inflation. The change in volume in the inflation due to the collapsing and distention of the inflation walls also causes surges or changes of pressure in the interior of the inflation. These changes in pressure are increased by the presence of milk in the inflation and tend to slow the rate at which milk can be drawn through the milk tube portion of the inflation. If these pressure surges are great and the milk cannot be moved away from the end of the teat rapidly, the inflation will be flooded and milk and air may be forced backwardly through the teat opening, thus, carrying bacteria into the teat. This is one of the known causes of mastitis in cows.

In claw type milking machines, bleeder holes have been provided in the metal claw to admit air for forcing the milk through the milk hose, however, this is only a partial solution to the problem with no air being admitted between the claw and the teat end, a column of milk may still form in the milk tube portion of the inflation. Thus, trapped milk may still be forced to back past the sphincter muscle into the teat opening.

Air holes have also been provided in the resilient walls of milking inflations. Holes in rubber inflations flex and do not admit a uniform amount of air. The rubber swells because of fat absorption and constricts the holes. Accordingly, the idea of merely forming a hole in the resilient wall of an inflation has not worked satisfactorily, primarily because of fluctuation of the hole size, thereby sometimes admitting too little air to remove the milk rapidly and at other times admitting too much air and inducing rancidity or operating difficulty such as excessive foaming.

SUMMARY OF THE INVENTION

Basically, my invention is to provide a rigid plug in the wall of the milk tube portion of a resilient milking inflation closely adjacent the teat receiving cup portion thereof and providing a properly calibrated port in the plug for admitting a metered amount of air into the upper end of the milk tube portion of the inflation to push the milk rapidly therefrom. The rigidity of the plug provides a hole of constant size during all phases of use, and the location of the plug admits air adjacent the end of the teat.

The plug can be used with any conventional milking inflation for rapidly removing milk from the inflation bore so that otherwise trapped milk will not interfere with the smooth flow of air from the collapsing inflation. My air-vent plug thereby effectively prevents the build-up of excessive pressures against the teat orifice.

The unique construction of my air-vent plug with a conical head and a barrel portion which tapers toward an enlarged flange facilitates easy insertion of the plug while at the same time preventing the plug from working out of the resilient wall of the inflation during use.

My invention, while seemingly quite simple, has nevertheless been shown to be a very important advance in the prevention of mastitis which is often now contracted when milk blockage builds up pressure at the teat end thereby forcing bacteria into the teat through the teat orifice.

Other objects, features and advantages of my invention will be apparent from the following detailed description taken in conjunction with the accompanying drawings showing a preferred embodiment exemplifying the principles of my invention.

DESCRIPTION OF THE PREFERRED EMBODIMENT

Figure 1:
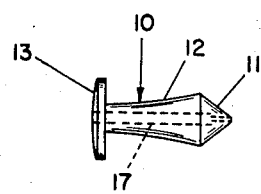
FIGURE 1 is a side elevation view of an air-vent plug embodying my invention showing the port in phantom.
Figure 2:
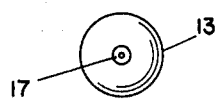
FIGURE 2 is an end view from the left side of FIGURE 1.
Figure 3:
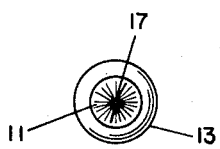
FIGURE 3 is an end view from the right side of FIGURE 1.

Referring now more particularly to the drawings wherein like numerals refer to like parts throughout the several views, my new air-vent plug is shown generally at 10 in FIGURES 1–4. As best shown in FIGURE 1, the air-vent plug has a conical head 11 and a barrel portion 12 which tapers toward an enlarged transverse flange 13. The plug is made of a tough, substantially rigid plastic.

Figure 4:
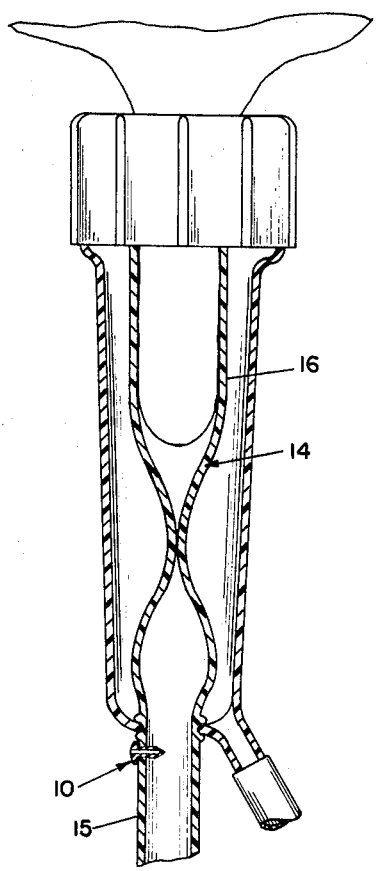
FIGURE 4 is a side elevation view, partially in section, of a teat cup assembly for milking machines with an air-vent plug embodying my invention positioned therein.

The conical head 11 of the plug facilitates easy insertion into the wall of the milk tube portion 15 of a milking inflation 14 adjacent the teat receiving cup portion 16 thereof as shown in FIGURE 4. The tapered barrel 12 and the flange 13 cooperate to securely hold the plug in the resilient wall and prevent the plug from inadvertently falling out or being worked out of the wall of the inflation during use.

The plug has a calibrated vent or air port 17 therein open to atmospheric pressure for admitting air to the upper end of the milk tube portion of the inflation adjacent the teat end. As shown in the drawings, the inner portion of the port 17 extending through the conical head 11 is smaller in diameter than the outer portion which extends through the barrel 12 and flange 13. The smaller portion of the port should be of a size ranging from a number 60 to 80 standard drill. Different size orifices are desirable for different types of milk hose lifts, the higher the lift the more air is necessary. The outer portion of the port is somewhat larger so as to prevent blockage of the port.

Ports in this size range will generally admit between about ½ to ⅛ cubic foot of air per minute. The air flow into the bore of the milk tube portion of the inflation should preferably not exceed ½ cubic foot per minute because a greater flow will tend to induce rancidity and operating difficulties such as excessive foaming. On the other hand, an air flow less than ⅛ cubic foot per minute will not provide sufficiently rapid removal of milk from the milk tube portion to prevent pressure build-up at the teat end and backwashing of air and milk.

Use of my new air-vent plug is particularly advantageous in narrow-bore inflations, that is, inflations having a diameter of ⅞ inch or less in the teat receiving cup portion, since these inflations do not permit as large a storage of milk in the inflation milk body as conventional large-bore inflations.

In use, as an inflation opens during the milking phase of the cycle, milk will partially fill the inflation milk tube, momentarily blocking the air and milk passageway. The inertia of the collapsed inflation resuming its normal shape in response to the vacuum being applied in the surrounding air-vacuum chamber causes a reduction in the pressure within the inflation bore and milk remaining in the inflation milk tube will "suck" backward or be forced into the reduced pressure area around the teat end. This backwash of milk bathes that teat end, contaminating the milk with bacteria from the teat and other milking machine components such as the milk tube, claw and milk hose may then be forced into the teat through the teat orifice. This is particularly true where the keratin has been removed by the pinching action of an inflation because the pressure differentials across the sphincter valve surrounding the teat opening will force bacteria into the teat cistern, thus, causing mastitis.

The use of my new air-vent plug in the upper portion of the inflation milk tube adjacent the end of the teat will cause milk to be rapidly carried away from the teat end and will prevent the inflation from acting like a suction pump. The entry of air under atmospheric pressure through my new air-vent plug prevents backwash of milk and build-up of excessive pressures on the teat end.

It is understood that my invention is not confined to the particular construction and arrangement of parts herein illustrated and described.

I claim:

1. An improvement in teat cup assemblies for milking macines having a resilient inflation suspended longitudinally within a rigid shell of substantially greater diameter to form an air-vacuum chamber therebetween, said inflation having an upper cup portion for receiving the teat of a cow, said cup portion being adapted to collapse below the end of the teat when said air-vacuum chamber is opened to atmospheric pressure and to open when said air-vacuum chamber is subjected to vacuum, said inflation having a milk tube portion below said teat receiving cup portion for carrying milk away from said cup portion; said improvement comprising, a substantially rigid plug extending through the wall of said milk tube portion near the upper end thereof adjacent said cup portion, said plug having a calibrated atmosphere vented air inlet port therethrough for admitting a metered amount of air into the upper end of said milk tube portion adjacent said cup portion for pushing milk out of said milk tube portion.

2. The improvement as specified in claim 1 wherein said plug has a barrel portion extending through a hole in the wall of the milk tube portion of said inflation and a transverse flange for abutting against the wall of said milk tube portion.

3. The improvement as specified in claim 2 wherein said barrel tapers toward said transverse flange to prevent said plug from working out of the wall of said milk tube portion during use.

4. An improvement as specified in claim 1 wherein the port in said plug is in the range of a number 60 to 80 standard drill size.

References Cited

UNITED STATES PATENTS

| | | | |
|---|---|---|---|
| 1,270,308 | 6/1918 | McLeod | 119—14.48 |
| 2,775,955 | 1/1957 | Anderson | 119—14.36 |
| 3,255,732 | 6/1966 | Raht | 119—14.52 |

ALDRICH F. MEDBERY, Primary Examiner

U.S. Cl. X.R.
119—14.49, 14.52